United States Patent [19]

Kawakami et al.

[11] Patent Number: 5,287,538

[45] Date of Patent: Feb. 15, 1994

[54] WORD PROCESSOR FOR REFORMATTING A CHARACTER GROUP BY LOCATING LINE FEED CODES AND SELECTING THE BEGINNING AND END OF THE TEXT WHEN THE LINE FEED CODES CANNOT BE LOCATED

[75] Inventors: Yasushi Kawakami, Nagoya; Fukue Obata, Yokkaichi; Kayoko Makihara, Kamagori, all of Japan

[73] Assignee: Brother Kogyo Kabushiki Kaisha, Aichi, Japan

[21] Appl. No.: 989,957

[22] Filed: Dec. 10, 1992

Related U.S. Application Data

[63] Continuation of Ser. No. 614,013, Nov. 14, 1990, abandoned, which is a continuation of Ser. No. 73,729, Jul. 15, 1987, abandoned.

[30] Foreign Application Priority Data

Jul. 15, 1986 [JP] Japan ................. 61-165773

[51] Int. Cl.$^5$ ............................. G06F 15/20
[52] U.S. Cl. .................... 395/800; 395/144; 395/145; 395/146; 395/148; 364/419.13; 364/225.6; 364/225.8; 364/943; 364/943.43; 364/943.44; 364/DIG. 2; 400/63; 400/76; 400/83
[58] Field of Search ............ 395/375, 800, 144, 145, 395/146, 148; 364/419; 400/63, 76, 83; 340/709, 711

[56] References Cited

U.S. PATENT DOCUMENTS

| | | | |
|---|---|---|---|
| 3,872,460 | 3/1975 | Fredrickson et al. | 340/789 X |
| 4,056,821 | 11/1977 | Vittorelli | 395/117 |
| 4,125,868 | 11/1978 | Hruby et al. | 395/100 |
| 4,240,758 | 12/1980 | Acosta | 400/279 |
| 4,425,629 | 1/1984 | Cason et al. | 364/900 |
| 4,513,391 | 4/1985 | Maddock | 364/900 |
| 4,587,631 | 5/1986 | Nielsen | 364/419 |
| 4,812,966 | 3/1989 | Takagi et al. | 364/200 |
| 4,831,583 | 5/1989 | Pascoe | 364/900 |

FOREIGN PATENT DOCUMENTS 0165442 5/1985 European Pat. Off. .

OTHER PUBLICATIONS

Microsoft Word 3.0 User Manual, pp. 21-24, 60, 61, 1986.
Dickinson, "Microsoft Word 3.0 gets better in most every way", PC Magazine, vol. 5, issue 10, p. 52, May 27, 1986.
Robinson, "It's a bird, it's a plane", Creative Computing, vol. 9, Feb. 1983, pp. 63-65.
IBM Technical Disclosure Bulletin, vol. 26, No. 4, Sep. 1983.

Primary Examiner—Thomas C. Lee
Assistant Examiner—Paul Harrity
Attorney, Agent, or Firm—Kane, Dalsimer, Sullivan, Kurucz, Levy, Eisele and Richard

[57] ABSTRACT

A word processor for setting a format of a text, having a format controller for controlling a newly set format to be effective from the beginning of a character data group to which the position where the format setting operation is carried out belongs, and a reformatter for reforming at least the character data group based upon the newly set format. The word processor searches backward and forward in the text for locating line feed codes designating the beginning and end of the character data group, respectively, and selects the beginning and end of the text when the line feed codes could not be located.

6 Claims, 7 Drawing Sheets

WORD PROCESSOR FOR REFORMATTING A CHARACTER GROUP BY LOCATING LINE FEED CODES AND SELECTING THE BEGINNING AND END OF THE TEXT WHEN THE LINE FEED CODES CANNOT BE LOCATED

This is a continuation of copending application Ser. No. 07/614,013 filed on Nov. 14, 1990 now abandoned which is a continuation of copening application Ser. No. 07/073,729 filed on Jul. 15, 1987 now abandoned.

BACKGROUND OF THE INVENTION

This invention relates to a word processor and more particularly to a format setter thereof for changing format during text editing (In this specification, "text editing" includes text creation).

In conventional word processors, the change of the format during editing a text or so on the word processor has been accomplished in a manner that, after moving the cursor to the position at which the change should start (change start position), the format setting mode is entered to change the format, then the mode is escaped so that the character data following the cursor position is reformed according to the newly set format.

With the above prior word processors, for changing the format during editing operation, it has been necessary to first move the cursor to the change start position, then entering the format setting mode. Also, when the format set mode is escaped after setting the new format, reforming operation takes place according to the new format, however the cursor remains positioned at the beginning of the reformed character data group so that the cursor has to be moved to the edit re-start position, resulting in an unsmooth restart of text editing operation.

SUMMARY OF THE INVENTION

It is therefore an object of the invention to provide an improved word processor in which the cursor need not be moved to the position at which the change of the format should start, and instead, the format change can take place from the beginning of character data group when the format change operation is carried out at any desired position existing within the group.

For this purpose, according to this invention, there is provided a word processor comprising a keyboard for inputting character data and function data, a display device for displaying the input character data on a screen, and a processing device for preparing a document based upon the input data and displaying it on said display device, the improvement which comprises in that said processing device is provided with format setter for setting a format of a text, format controller for controlling newly set format to be effective from the beginning of a character data group to which the position where the format set operation is carried out belongs, and a reformer for reforming at least said character data group based upon newly set format.

With the word processor as above constructed, when the format is set at an arbitrary position within the text by operating to enable the newly set format from the beginning of the character data group in which the above arbitrary position exists, and at least the whole character data from the beginning of the group is then automatically reformed according to the newly set format.

DESCRIPTION OF THE PREFERRED EMBODIMENT

A preferred embodiment of the invention is now described with reference to the accompanying drawings.

Figure 1:
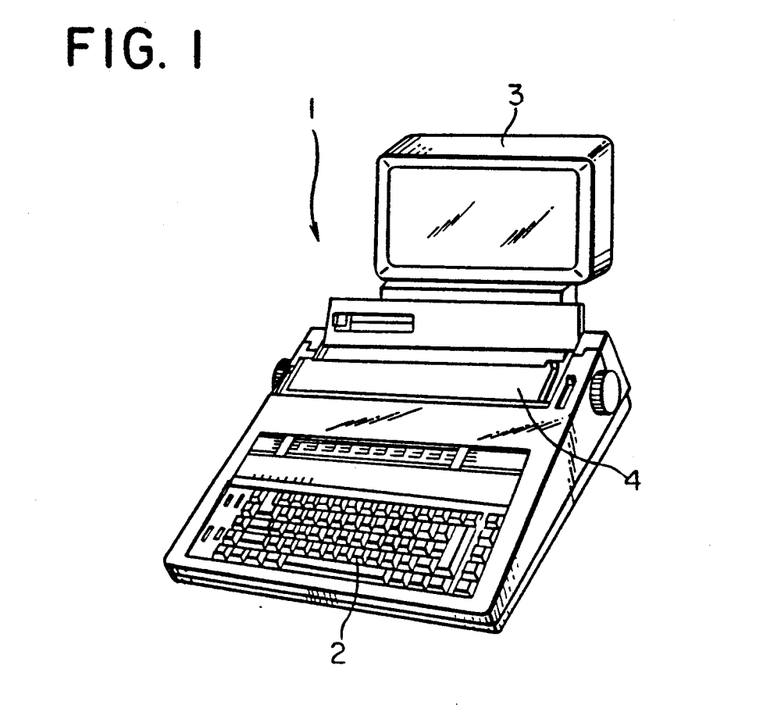
FIG. 1 is a perspective external view of the word processor embodying the invention.

FIG. 1 is a perspective external view of the word processor 1 which comprises a keyboard 2 to be operated when setting various modes and inputting character data, a display section 3 provided with a CRT for display of the characters and symbols input through the keyboard 2 and stored in a memory device installed in the word processor 1, and printer section 4 for printing out the characters and the like stored in the memory device.

Figure 2:
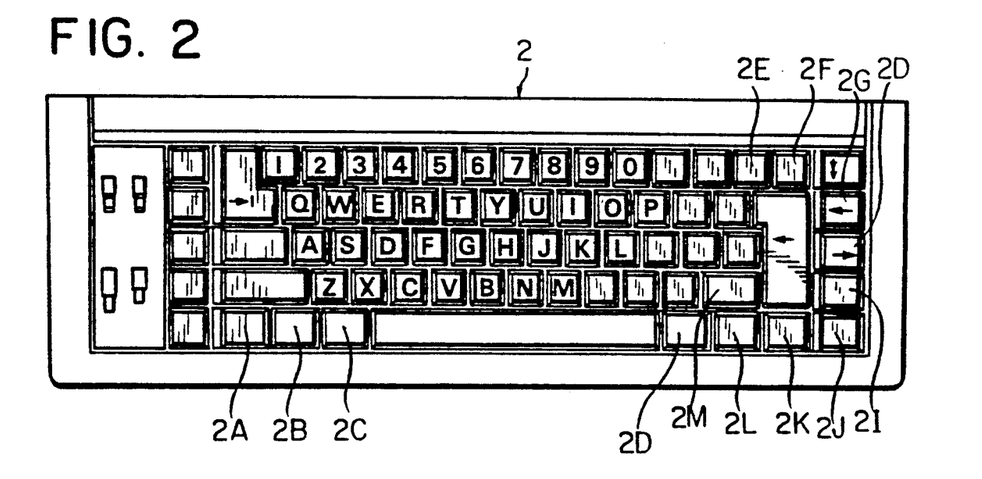
FIG. 2 is a plan view of the keyboard section of the word processor shown in FIG. 1.

FIG. 2 is a plan view showing the detail of the keyboard 2 with a layout of various function keys and character keys. The keys 2A, 2B, 2C, 2D, 2E, 2F, 2G, 2H, 2I, 2J, 2K, 2L and 2M shown here will be described later in detail.

Figure 3:
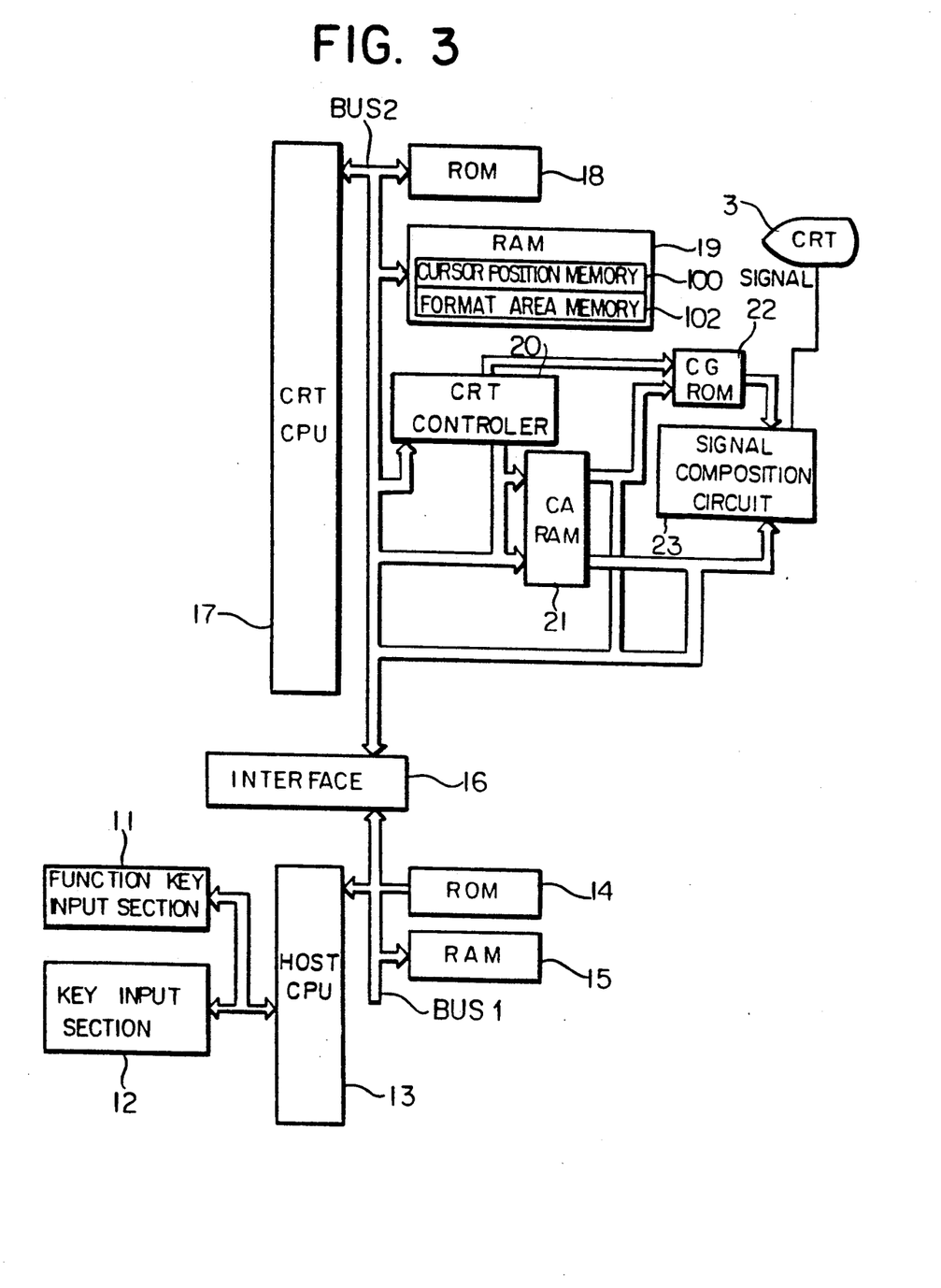
FIG. 3 is a block diagram of the electric circuit installed within the word processor shown in FIG. 1.

FIG. 3 shows a block diagram of the electrical circuit of the word processor 1. As shown in FIG. 3, the function keys on the keyboard 2 are connected to the function key input section 11 and the character keys to the key input section 12. The function key input section 11 and the key input section 12 serve as interface between the function and character keys and a host computer 13. Connected to the host computer 13 via bus line BUS1 are a read only memory (ROM) 14 and a random access memory (RAM) 15.

The general control program for the word processor 1 is stored in the ROM 14, while the RAM 15 contains therein the function data and character data given by operating the keyboard 2.

The host computer 13 is connected to a CRT control computer 17 to control the display (CRT) 3 through the interface circuit 16. Connected to the CRT control computer 17 via bus line BUS2 are a ROM 18 and RAM 19 and also a CRT controller 20. The ROM 18 stores therein the control program for controlling the CRT 3. The RAM 19 temporarily stores a variety of data for controlling the CRT 3 and is provided with a cursor current position memory 100 to keep the current position of the cursor in memory and a format area memory 102 which keeps the range of the format area in memory. The CRT controller 20 is connected at its output to a character attribute random-access-memory (CARAM) 21 which keeps in memory such attribute data as characters, underline and boldface. There is further provided a signal composition circuit 23 with which, in response to the output command from the CRT controller 20, the data read from the CARAM 21 and the data read from the character generator readonly-memory (CGROM) 22 are composed to output the display data onto the display 3.

Figure 4A:
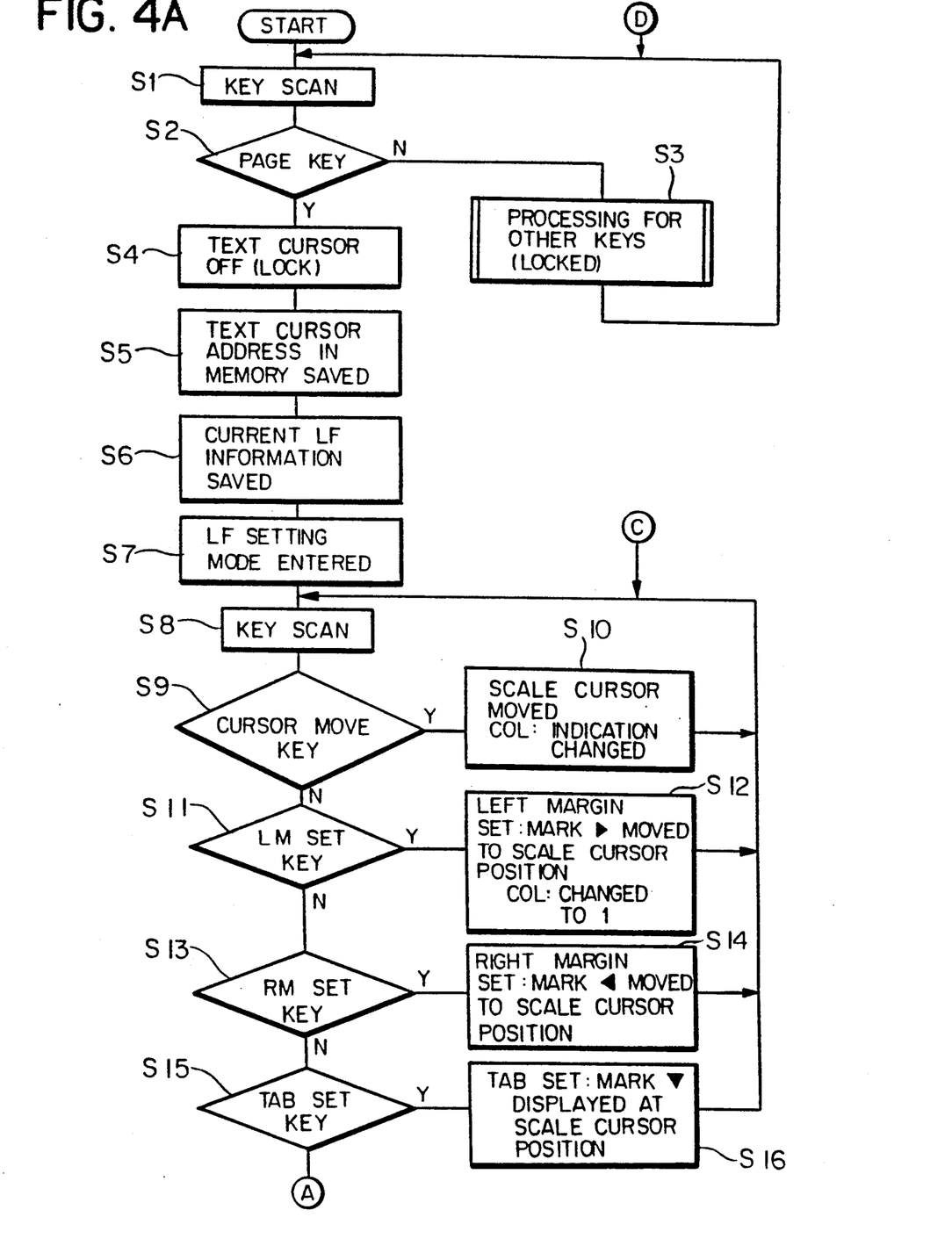
FIG. 4(A), 4(B), and 4(C) are flow charts showing the process for format change.
Figure 4B:
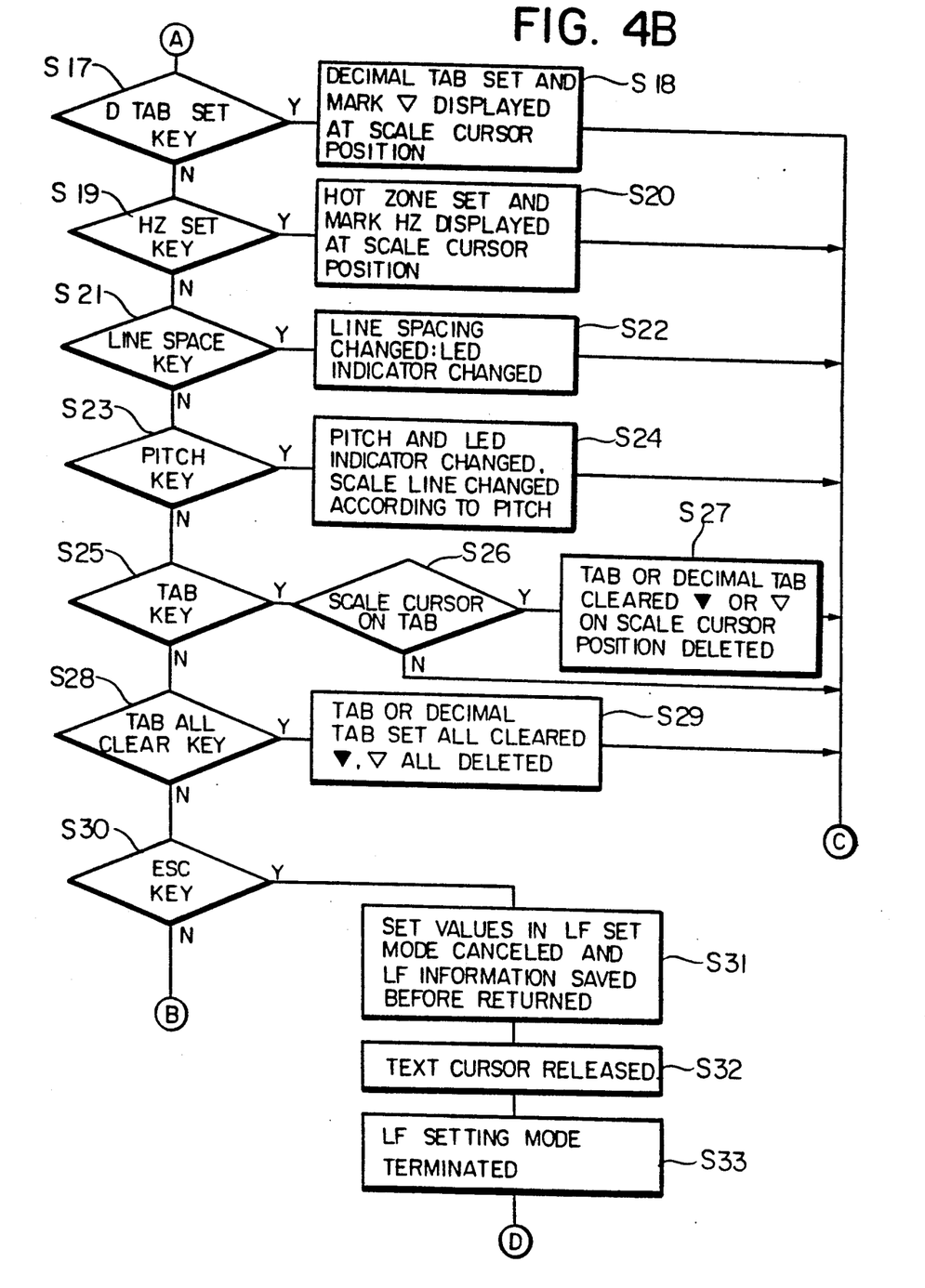
Figure 4C:
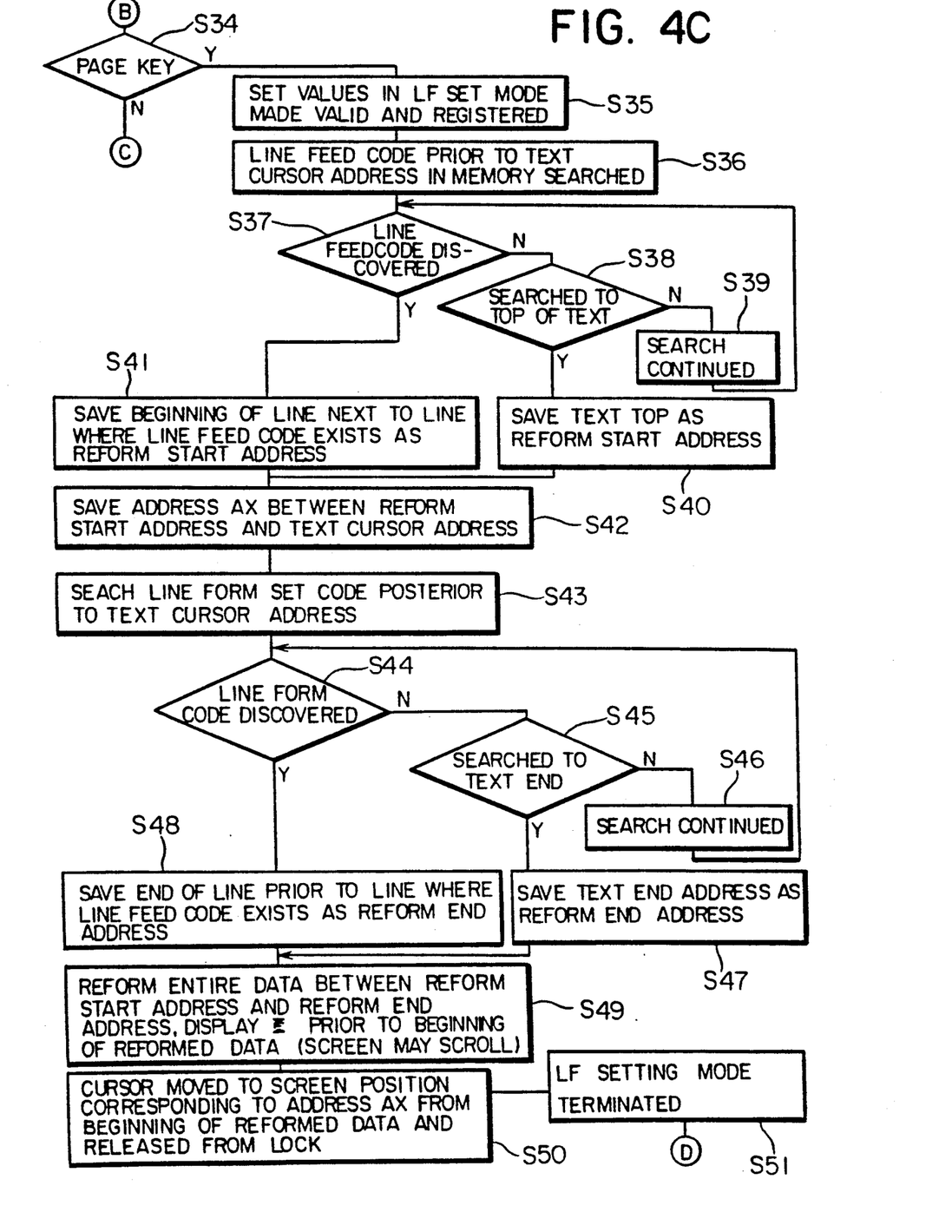

In the word processor 1 equipped with the electric circuit blocks as described above, the processing takes place as shown in the flow chart of FIGS. 4(A) through (C).

Figure 5:
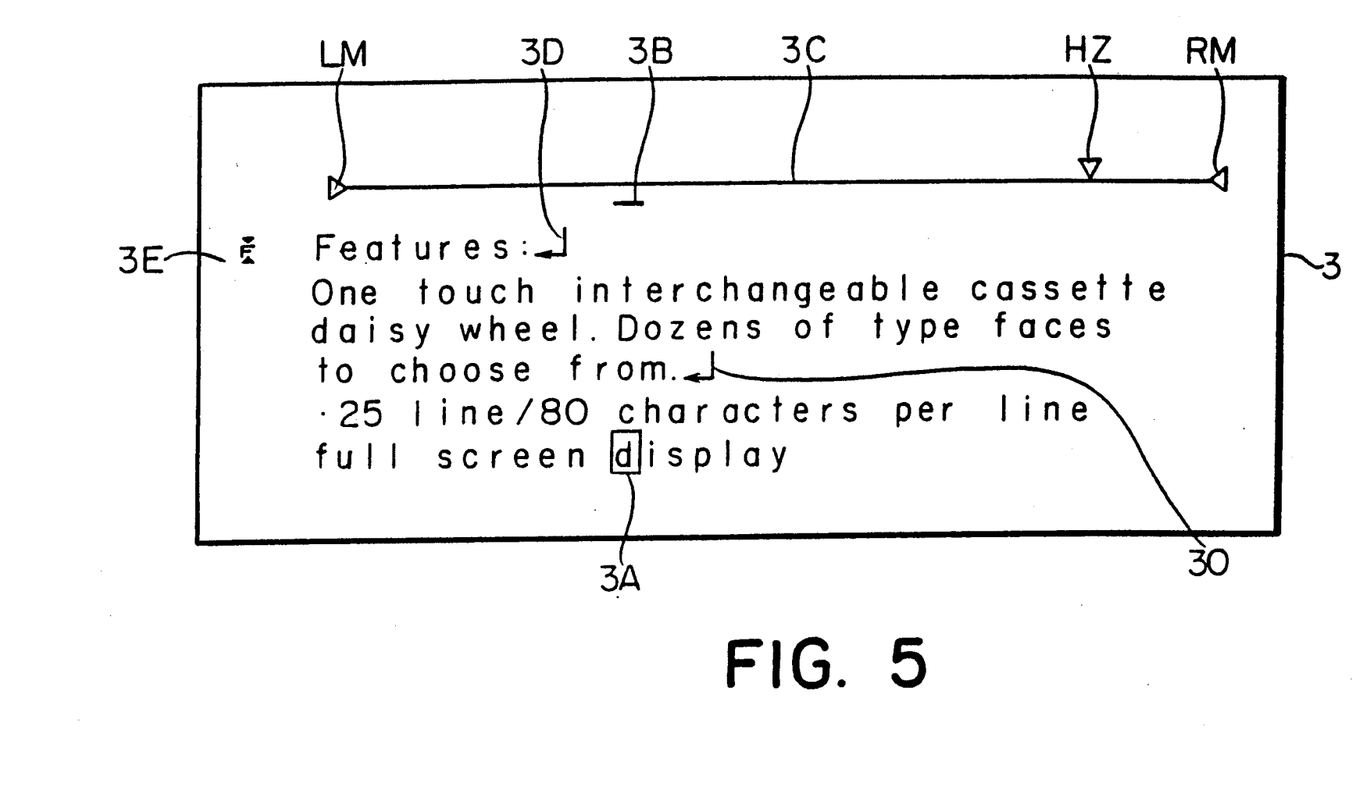
FIG. 5 is an illustrative view of the CRT screen display before reforming.
Figure 6:
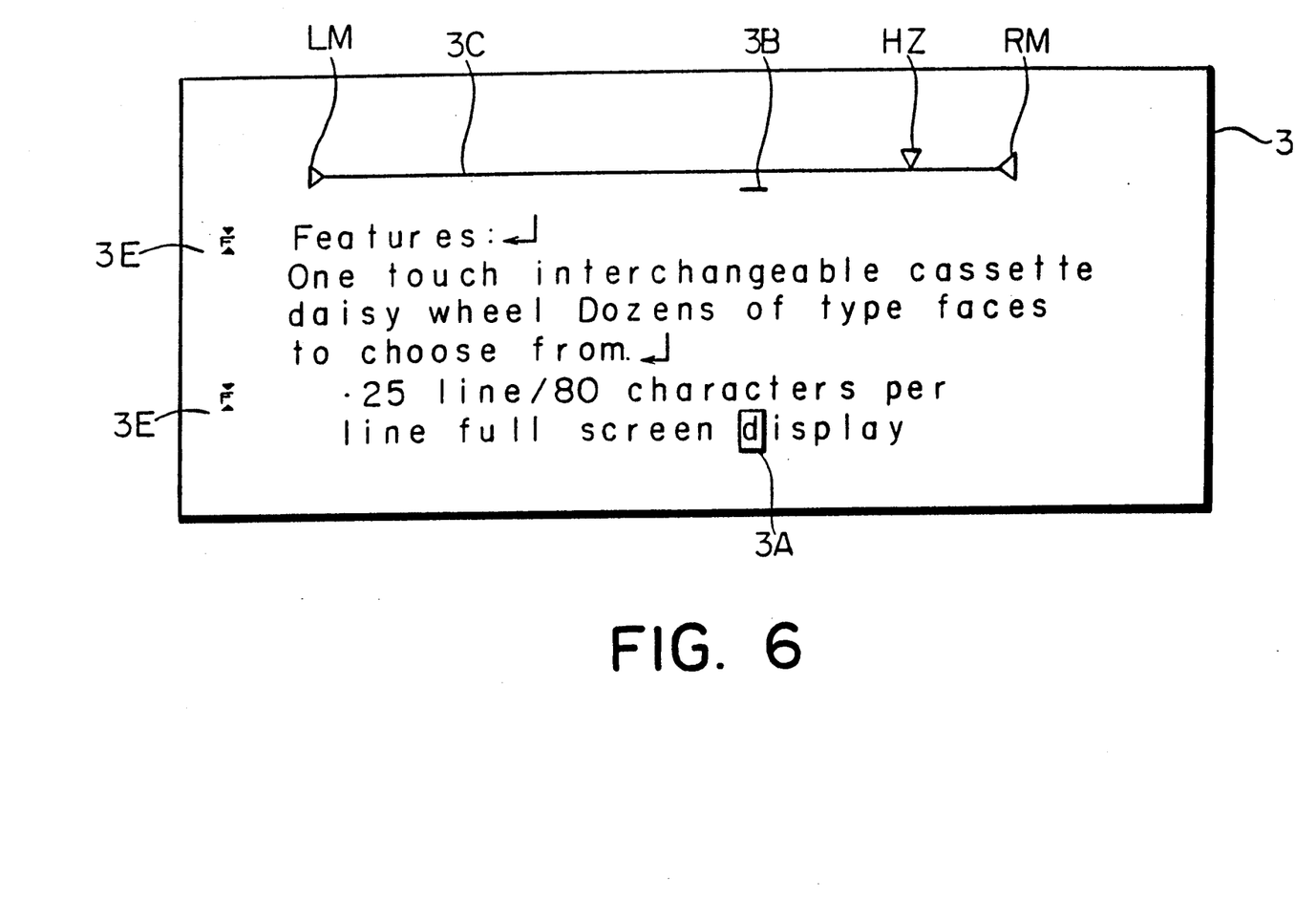
FIG. 6 is a view similar to FIG. 5 showing the CRT screen display after reforming.

The operation of the preferred embodiment is now described with reference to the flow chart of FIGS. 4(A) through (C) and the illustrative views of the CRT screen on the display section 3 shown in FIGS. 5 and 6, wherein FIG. 5 shows the CRT screen before changing the line form setting as described below and FIG. 6 shows that after changing the line form setting.

In the word processor 1, the host computer 13 performs key scanning during text editing, as indicated in the Step S1 (hereinafter referred to simply as S1 . . . S44). It examines in S2 whether the page key (format change key) 2A on the keyboard 2 has been depressed down and if it determines the page key 2A is not down, processing takes place for other keys in S3. If, on the other hand, the page key 2A is found to be down, the text cursor 3A on the CRT screen of display section 3 is brought to standstill in S4 as shown in FIG. 5. Next in S5, the text cursor address in the RAM 19 is saved, while further saving in S6 the current line format information such as left margin LM, right margin RM, scale cursor 3B, hot zone HZ, scale line 3C, and format setting code 3E. Control of the line form setting mode is now started in S7. The host computer 13 performs key scanning in S8 to check if the following keys have been depressed. When detecting a key depressed, a corresponding processing for the key depressed is accomplished, then returning to S8.

When the right or left cursor move key 2G or 2H are detected to be down in S9, the scale cursor 3B shown in FIG. 5 is moved to the position shown in FIG. 6 in S10 and the column indicator (COL) not shown is changed accordingly. When the left margin (LM) set key 2B is found to be down as indicated in S11, the left margin LM is set in S12 to move the left margin LM to the position of the scale cursor 3B, with the left margin LM mark ▶ displayed on the display section 3 and the column indicator not shown changed to 1.

When the right margin (RM) set key 2C is depressed as in S14, the right margin RM is set in S4 on the display section 3 as indicated in FIG. 6 to move the right margin RM to the position of the scale cursor 3B, with the right margin RM mark ◀ displayed on the display section 3. When the tab set key 2D is found to be down is S15, the tab is set as indicated in S16 to display the tab mark ▼ not shown at the position of the scale cursor 3B. When the decimal tab set key 2E is found to be down in S17, the decimal tab is set as indicated in S18 to display the decimal tab mark ▽ not shown at the position of the scale cursor 3B. When the hot zone (HZ) set key 2F is found to be down in S19, the hot zone is set as indicated in S20 to display the hot zone mark HZ at the position of the scale cursor 3B. When the line space key 2I is found to be down in S21, the line spacing is changed as indicated in S22 to change the indication of the LED (light emitting diode) of the keyboard 2. Detecting the pitch key 2J to be down in S23 causes changes in pitch, LED indication and scale line 3C on the display section 3. When the tab clear key 2K is found to be down in S25, S26 is processed to determine whether the tab is placed at the position of the scale cursor 3B where the tab clear key 2K has been depressed, and if the scale cursor position is found to coincide with the tab position, the tab is cleared to delete the tab mark or the decimal tab mark. The S8 resumes if the scale cursor position does not coincide the tab position. If the tab all clear key 2L is found to be down in S28, all the tabs and decimal tabs currently set are cleared as indicated in S29, also deleting the tab mark and decimal tab mark.

When the escape (ESC) key 2 is found to be down in S30, the set values in the line form setting mode are canceled as indicated in S31 to call back the line format information saved in S6. S32 releases the text cursor 3A from its locked state and S33 terminates the line form setting mode to return to S1.

When the aforementioned page key 2A is found in S34 to have been depressed again after depressing in S2 as mentioned above, the set values in the current line form setting mode are registered as valid as indicated in S35. S36 then processes to search the line feed cods prior to the text cursor address, a line feed mark 3D in FIG. 5, on the RAM 19 S37 examines whether the line feed code has been discovered. If S37 determines the line feed code (the line feed mark 3D) is not discovered, S38 examines if the search has reached the top of text. If the top of text is not reached according to S38m, the search goes on as indicated in S39 and returns to S37.

When, on the contrary, the top of text is reached according to S38, the text top address is saved as a reform start address in S40. On the other hand, when the line feed code is found in S37, the beginning of the line next to the line where the line feed code exists is saved as a reform start address in S41. Then, the number of addresses AX between the reform starting address and the text cursor address is saved in S42.

S43 then processes to reach the line form set code posterior to the text cursor address, a line form set mark 3F in FIG. 5, on the RAM 19 and S44 examines whether the line form set code has been discovered. If S44 determines the line form set code is not discovered, S45 examines if the search has reached to the end of text. If the end of text is not reached according to S45, the search goes on as indicated in S46 and returns to S44.

When, on the contrary, the end of text is reached according to S45, the text end address is saved as a reform end address in S46. On the other hand, when the line format set code is formed in S44, the end of the line prior to the line where when the line form set code exists is saved as the reform end address in S48.

S49 then processes to reform entire data between the reform start address and the reform end address, with displaying the line form set mark 3E, as shown in FIG. 6 prior prior to the beginning of reformed data. Thereafter, the text cursor 3A is moved from its locked position to the screen display position in S50 corresponding to the member of addresses AX saved in the above S42 from the beginning of the reformed data. The line form setting mode is thus terminated in S51, returning to S1.

According to the above constructed word processor, therefore, the cursor need not be moved to the position at which the change of the format should start, and instead, the format setting operation can take place at any desired position of character data group to which the position where format change operation is carried out exists. This provides an easy operation and smooth re-start of text editing.

What is claimed is:

1. In a word processor comprising a keyboard for inputting character codes, function codes, and text format codes, a display device for displaying at least the input character codes on a screen, memory means for storing said input character codes, a processing device for preparing a text with a plurality of lines comprising the input codes stored in said memory means and displaying the text on said display device, and designating means for designating a position on said screen at which one of said character codes is to be inputted, an improvement which comprises that said processing device is provided with format setting means for setting a text format, search means coupled to said designating means and said memory means for searching for the beginning and end of a character data group of said text having at least two lines based upon the position designated by said designating means, said character data group being defined between first and second line feed codes;

said search means searches backward from the designated position to the beginning of the text to locate said first line feed code; if said line feed code is located, selecting the beginning of the next line following said first line feed code as the beginning of said character data group and if said first line feed code is not located, selecting the beginning of the text as the beginning of said character data group;

said search means further searches forward from the designated position to the end of the text to locate said second line feed code; if said second line feed code is located, selecting the end of the line preceding said second line feed code as the end of said character data group and if said second line feed code is not found, selecting the end of the text as the end of said character data group; and reforming means for reforming at least said character data group of said text displayed on said display means in accordance with a newly set text format set by the format setting means without requiring a repositioning of said designate means.

2. The word processor according to claim 1 wherein said designating means comprises a text cursor and wherein said keyboard is provided with a format change key for instructing a format change of the character data group which includes the current position of the text cursor.

3. The word processor according to claim 2 wherein said processing device further comprises means for saving number of addresses between reform start address and text cursor address with said format change key depressed while bringing said text cursor to standstill, and means for moving said text cursor to the screen position corresponding to said saved number of addresses from the beginning of reformed data.

4. The word processor according to claim 2 wherein said keyboard is further provided with a cancel key for cancelling the instruction for changing the format, and said processing device further comprises means for saving a current format data with said format change key depressed and means for restoring said saved format data when said cancel key is depressed.

5. The word processor according to claim 1 wherein said processing device further comprises means for displaying a special code mark on said display device at the beginning of said character data group searched by said searching means.

6. In a word processor comprising a keyboard for inputting character codes, function codes, and text format codes, a display device for displaying at least the input character codes on a screen, memory means for storing said input character codes, a processing device for preparing a text with a plurality of lines comprising the input codes stored in said memory means and displaying the text on said display device, and designating means for designating a position on said screen at which one of said character codes is to be inputted, an improvement which comprises that said processing device is provided with format setting means for setting a text format, search means coupled to said designating means and said memory means for searching for the beginning and end of a character data group of said text having at least two lines based upon the position designated by said designating means, said character data group being defined between a first and a second line feed codes;

said search means searches backward from the designated position to the beginning of the text to locate said first line feed code; if said first line feed code is located, selecting the beginning of the next line following said first line feed code as the beginning of said character data group and if said first line feed code is not located, selecting the beginning of the text as the beginning of said character data group;

said search means further searches forward from the designated position to the end of the text to locate said second line feed code; if said second line feed code is located, selecting the end of the line preceding said second line feed code as the end of said character data group and if said second line feed code is not found, selecting the end of the text as the end of said character data group; and changing means for changing the text format of said character data group in accordance with a newly set text format set by the format setting means.

* * * * *